United States Patent
Oyman et al.

(10) Patent No.: US 9,125,073 B2
(45) Date of Patent: Sep. 1, 2015

(54) QUALITY-AWARE ADAPTIVE STREAMING OVER HYPERTEXT TRANSFER PROTOCOL USING QUALITY ATTRIBUTES IN MANIFEST FILE

(71) Applicant: Intel Corporation, Santa Clara, CA (US)

(72) Inventors: Ozgur Oyman, San Jose, CA (US); Yiting Liao, Hillsboro, OR (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 13/711,316

(22) Filed: Dec. 11, 2012

(65) Prior Publication Data

US 2014/0040498 A1     Feb. 6, 2014

Related U.S. Application Data (60) Provisional application No. 61/679,627, filed on Aug. 3, 2012.

(51) Int. Cl.
   *G06F 15/16*         (2006.01)
   *H04W 24/02*       (2009.01)
   *H04W 24/04*       (2009.01)
   *H04W 76/02*       (2009.01)
   (Continued)

(52) U.S. Cl.
CPC ........... *H04W 24/02* (2013.01); *H04L 41/0836* (2013.01); *H04L 43/0811* (2013.01); *H04L 65/4092* (2013.01); *H04L 65/80* (2013.01); *H04N 21/23439* (2013.01); *H04N 21/25825* (2013.01); *H04W 24/04* (2013.01); *H04W 40/02* (2013.01); *H04W 76/021* (2013.01); *H04W 76/023* (2013.01); *H04W 76/025* (2013.01); *H04W 76/026* (2013.01); *H04W 16/28* (2013.01); *H04W 36/14* (2013.01); *Y02B 60/50* (2013.01)

(58) Field of Classification Search
CPC ........................... H04L 65/4092; H04L 65/80
See application file for complete search history.

(56) References Cited

U.S. PATENT DOCUMENTS 8,640,174 B2 *    1/2014    Salkintzis et al. ............... 725/62
8,694,669 B2 *    4/2014    Park et al. ...................... 709/231
(Continued)

OTHER PUBLICATIONS

International Search Report and Written Opinion received for PCT Application No. PCT/US2013/047277, mailed on Aug. 29, 2013, 10 pages.

(Continued)

*Primary Examiner* — Lance Leonard Barry
(74) *Attorney, Agent, or Firm* — Stoel Rives LLP (57) ABSTRACT

A wireless network device to support quality-aware adaptive media streaming includes a radio-frequency transceiver, a processor operably coupled to the radio-frequency transceiver, and a memory device operably coupled to the processor. The memory storing instructions that configure the processor to parse a manifest file to read information characterizing media content available for hypertext transfer protocol (HTTP) adaptive streaming, obtain quality information of the media content based on a quality attribute parsed from the manifest file, and dynamically switch streaming between different encoded portions of the media content in response to the quality information for an encoded portion of the media content deviating from a desired quality value.

7 Claims, 7 Drawing Sheets

(51) Int. Cl.
*H04L 29/06* (2006.01)
*H04N 21/2343* (2011.01)
*H04N 21/258* (2011.01)
*H04W 40/02* (2009.01)
*H04L 12/24* (2006.01)
*H04L 12/26* (2006.01)
*H04W 36/14* (2009.01)
*H04W 16/28* (2009.01)

(56) References Cited

U.S. PATENT DOCUMENTS

| | | | |
|---|---|---|---|
| 8,745,677 B2* | 6/2014 | Stanwood et al. | 725/95 |
| 2009/0210549 A1 | 8/2009 | Hudson et al. | |
| 2011/0161485 A1 | 6/2011 | George et al. | |
| 2012/0023254 A1 | 1/2012 | Park et al. | |
| 2012/0047280 A1 | 2/2012 | Park et al. | |
| 2012/0117263 A1 | 5/2012 | Xu | |
| 2012/0155398 A1 | 6/2012 | Oyman et al. | |
| 2012/0209952 A1 | 8/2012 | Lotfallah et al. | |
| 2012/0281536 A1* | 11/2012 | Gell et al. | 370/235 |
| 2013/0036234 A1 | 2/2013 | Pazos et al. | |
| 2013/0095806 A1* | 4/2013 | Salkintzis et al. | 455/414.3 |
| 2013/0124749 A1 | 5/2013 | Thang | |
| 2013/0182643 A1 | 7/2013 | Pazos et al. | |
| 2013/0191511 A1* | 7/2013 | Liu et al. | 709/219 |
| 2013/0262693 A1 | 10/2013 | Phillips et al. | |
| 2013/0282917 A1 | 10/2013 | Reznik et al. | |
| 2013/0290493 A1 | 10/2013 | Oyman et al. | |
| 2013/0290556 A1 | 10/2013 | Giladi | |
| 2013/0297743 A1* | 11/2013 | Eschet et al. | 709/219 |
| 2013/0298170 A1* | 11/2013 | ElArabawy et al. | 725/62 |
| 2014/0019593 A1* | 1/2014 | Reznik et al. | 709/219 |
| 2014/0040498 A1* | 2/2014 | Oyman et al. | 709/231 |
| 2014/0207965 A1* | 7/2014 | Park et al. | 709/231 |

OTHER PUBLICATIONS

Sodagar, Iraj, "The MPEG-DASH Standard for Multimedia Streaming Over the Internet," IEEE MultiMedia, vol. 18, Issue No. 4, Oct.-Dec. 2011, pp. 62-67.

* cited by examiner

QUALITY-AWARE ADAPTIVE STREAMING OVER HYPERTEXT TRANSFER PROTOCOL USING QUALITY ATTRIBUTES IN MANIFEST FILE

RELATED APPLICATIONS

The present application claims the benefit of priority under 35 U.S.C. §119(e) to U.S. Provisional Patent Application No. 61/679,627, filed Aug. 3, 2012, which is hereby incorporated by reference herein in its entirety.

BACKGROUND INFORMATION

Hypertext transfer protocol (HTTP) streaming is a form of multimedia delivery of internet video and audio content—referred to as multimedia content, media content, media services, or the like. In HTTP streaming, a multimedia file can be partitioned into one or more segments and delivered to a client using the HTTP protocol. HTTP-based multimedia content delivery (streaming) provides for reliable and simple content delivery due to broad previous adoption of both HTTP and its underlying protocols, Transmission Control Protocol/Internet Protocol (TCP/IP). Moreover, HTTP-based delivery simplifies streaming services by avoiding network address translation (NAT) and firewall traversal issues. HTTP-based streaming also provides the ability to use standard HTTP servers and caches instead of specialized streaming servers that are more difficult to scale due to additional state information maintained on those servers. Examples of HTTP streaming technologies include Microsoft Internet Information Services (IIS) Smooth Streaming, Apple HTTP Live Streaming, and Adobe HTTP Dynamic Streaming.

Adaptive video streaming involves continuously optimizing video configurations such as bit rate, resolution, and frame rate based on changing link conditions, device capabilities, and content characteristics. Adaptive streaming improves the video viewing experience for the end client user in terms of performance goals such as high video quality, low startup delay, and interrupt-free playback. Traditionally, adaptive video streaming involved a Real-Time Streaming Protocol (RTSP). RTSP includes a client that connects to a streaming server that tracks the client's state until it disconnects. Tracking the client's state entails frequent communication between the client and the server, including session provisioning and negotiation of media parameters. Once the client and the server establish a session, the server sends the media as a continuous stream of packets over either User Datagram Protocol (UDP) or TCP transport. Example technologies for RTSP-based adaptive streaming include Microsoft Windows Media™, Apple QuickTime™, Adobe Flash™, and Helix™ by Real Networks, among others.

Dynamic adaptive streaming over HTTP (DASH) is an adaptive HTTP streaming technology standardized in the Third Generation Partnership Project (3GPP) TS 26.247 and the Moving Picture Experts Group (MPEG) ISO/IEC DIS 23009-1; however, various standards organizations implement DASH technology including the Open Internet Protocol Television (IPTV) Forum (OIPF) and Hybrid Broadcast Broadband TV (HbbTV), among others. DASH operates differently in comparison to RTSP-based adaptive streaming because DASH operates by the use of the stateless HTTP protocol.

DASH specifies formats for a media presentation description (MPD) metadata file. The MPD file provides information on the structure and different versions of the media content representations stored in the server. The MPD file also specifies the segment formats, i.e., information concerning the initialization and media segments for a media player to ensure mapping of segments into media presentation timeline for switching and synchronous presentation with other representations. For example, the media player inspects initialization segments identified in the MPD file to understand container format and media timing info.

Wireless communication technology, such as Worldwide Interoperability for Microwave Access (WiMAX) or Long Term Evolution (LTE), has evolved to deliver rich multimedia and video services in addition to the traditional voice and data services. Typical wireless multimedia communications involve the transmission of a continuous source over a noisy channel. Common examples are speech communications, mobile TV, mobile video, and broadcast streaming. In such communications, the multimedia source is encoded and compressed into a finite stream of bits, and the bit stream is then communicated over the noisy channel. Source coding is carried out to convert the continuous source into a finite stream of bits. Channel coding is performed to mitigate the errors in the bit stream introduced by the noisy channel. Source and channel coding introduce quality degradation during playback of the media that is generally attributable to such factors as high distortion levels, limited bandwidth, excessive delay, power constraints, and computational complexity limitations. Nevertheless, it may be important to transmit the source over time-varying wireless channels while satisfying certain end-to-end quality of service (QoS) or quality of experience (QoE) constraints, including average distortion and multimedia quality requirements, such as in real-time mobile video streaming.

BRIEF DESCRIPTION OF THE DRAWINGS

Aspects of embodiments will be apparent from the following detailed description of embodiments, which proceeds with reference to the accompanying drawings. Embodiments are illustrated by way of example and not by way of limitation in the figures of the accompanying drawings.

DETAILED DESCRIPTION OF EMBODIMENTS

In DASH, a manifest file (called a media presentation description, or MPD file in the context of DASH) provides hierarchical metadata information on the structure and availability of different versions of media content available for streaming. Decreasing hierarchical levels of the MPD file characterize smaller portions of the media content. For example, in an MPD file, an adaptation set represents a media content component (e.g., the main video, audio, captions, or other component), and a representation element within an adaptation set describes a deliverable encoded version of one or several media content components. DASH also provides for sub-representations, which typically provide the ability for accessing a lower quality version of the representation in which they are contained. Sub-representations, for example, allow extracting the audio track in a multiplexed representation or may allow for efficient fast-forward operations if provided with lower frame rate. DASH also specifies uniquely addressable portions of representations (called segments), including information to ensure mapping of segments into a media presentation timeline for switching and synchronous presentation between different representations of an adaptation set, or between different representations of two or more adaptation sets.

In one example, an MPD file specifies audio and video components as separate adaptation sets, each of which includes one or more representations that describe different available versions of the respective component contents. In some embodiments, the different available versions are encoded at different bitrates, frame rates, resolutions, codec types, or other characteristics specified at the representation or segment levels within an adaptation set (or sub-representation or sub-segment levels).

Based on MPD metadata information that describes the relation of the segments and how they form a media presentation, clients request the segments using HTTP GET or partial GET methods. As a client requests data, the server responds by sending the data, at which point the transaction is terminated. Thus, each HTTP request is handled as a completely standalone, one-time transaction. The client fully controls the streaming session, i.e., it manages the on-time request and smooth playout of the sequence of segments, potentially requesting segments having different bitrates or other video adaptation parameters while reacting to changes of the device state or the user preferences. Thus, DASH moves the adaptive streaming intelligence from the server to the client; the client drives the streaming session and makes decisions on the attributes that indicate video adaptation parameters. DASH-based services are deliverable over different 3GPP radio access network (RAN) and core IP network architectures and support adaptation parameters such as QoS and service adaptation based on QoE.

To enable delivery of multimedia content with high QoE in a widespread fashion, it is beneficial to devise generic cross-layer design methodologies for optimizing user QoE and increasing the QoS. QoE-driven cross-layer optimization is based on resource management strategies at the lower layers (i.e., PHY, MAC, network, and transport layers) by designing video compression and streaming algorithms that account for error control and resource allocation mechanisms provided by the lower layers, and by considering the specific characteristics of video applications. For example, PHY/MAC/NET-aware bit rate adaptation at the codec level enables the streaming service to adapt its bitrate to varying network conditions (e.g., changing resource availability, time-varying nature of the wireless channel) ensuring higher QoE while maintaining interrupt-free playback of the multimedia content. Application-aware PHY/MAC/NET adaptation at the radio, network, and transport layers by exploiting knowledge of various application-layer attributes associated with the video content and service. For instance, the knowledge of the rate-distortion characteristics of the video stream can allow for performing QoE-aware scheduling at the PHY/MAC layer that enhances video quality. Another example is content-aware adaptive streaming in which the transport-level streaming protocols are adapted to the video content characteristics.

Video content characteristics often change based on the nature of the content, which is one reason why encoders cannot always produce consistent quality and at the same time produce bit streams that have certain, specified bitrates. For example, rapidly switching active and static scenes, such as in sports video clips during a news broadcast, are difficult to encode with consistent quality and, therefore, the quality of the encoded data may fluctuate significantly. Furthermore, current wireless communication systems and adaptive streaming protocols (e.g., 3GPP DASH and MPEG DASH) do not provide for exchange of QoE information in the MPD file to indicate fluctuations in quality. Instead, the PHY/MAC/NET layers are agnostic of application-layer requirements and characteristics and simply aim to optimize link-quality according to certain target QoS requirements (e.g., throughput, latency/jitter, packet error/loss rate, or other QoS requirements).

Figure 1:
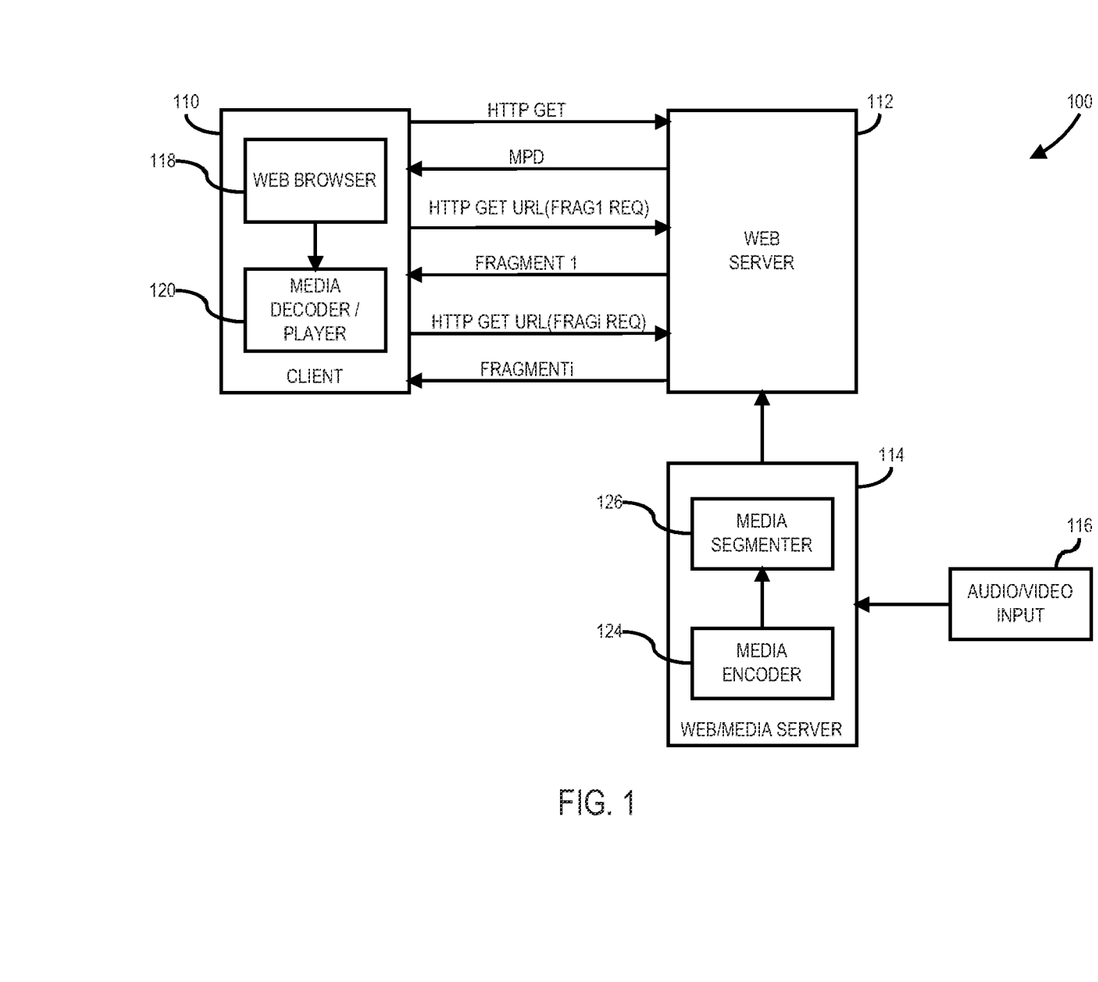
FIG. 1 is a block diagram of procedures at the client and server for DASH.

FIG. 1 shows a DASH-enabled adaptive streaming network 100 including a client 110 that obtains multimedia services from a web server 112, which in turn serves the multimedia content from a web/media server 114 on which the multimedia content is stored. The web/media server 114 receives the multimedia content via audio/video input 116, which may be a live input stream or previously stored media content, wherein the media is streamed to the client 110. Web/media server 114 may include a media encoder 124 to encode the media content to a suitable format, and media segmenter 126 to split the input media content into a series of fragments or chunks suitable for streaming. Client 110 may include a web browser 118 to interact with web server 112 and a media decoder/player 120 to decode and render the streaming multimedia content.

In some embodiments, the client 110 opens one or several TCP connections to one or several standard HTTP servers or caches. The client then retrieves an MPD file providing metadata information on the structure and availability of different versions of the media content stored in the web/media server 114, including, for example, different bitrates, frame rates, resolutions, codec types, and other MPD data model information specified in the DASH standards, 3GPP TS 26.247 and ISO/IEC 23009-1: 2012(E). In some embodiments, XML parser software executing on the client 110 opens (or accesses from memory) the MPD information and reads portions of the MPD contents to obtain the HTTP URL of segments and other associated metadata information so that the segments can be mapped into the media presentation timeline. The client 110 requests new data in chunks using HTTP GET or partial HTTP GET messages to obtain smaller data segments (HTTP GET URL(FRAG1 REQ), FRAGMENT 1, HTTP GET URL(FRAGi REQ), FRAGMENTi) of the selected version of media file with individual HTTP GET messages which imitates streaming via short downloads as shown in FIG. 1. The URL of the HTTP GET message is used to tell the web server 112 which segment or segments the client is requesting. As a result, the web browser 118 pulls the media from web server 112 segment by segment (or sub-segment by sub-segment based on byte range requests).

Implementation of DASH on the network 100 provides the client 110 an ability to choose automatically an initial content rate to match initial available bandwidth without requiring the negotiation with the streaming web server 112, and to thereafter switch dynamically between different bitrates of representations as the available bandwidth changes. As a result, implementing DASH on network 100 allows faster adaptation to changing network and wireless link conditions, user preferences, content characteristics and device capabilities such as display resolution, processor speed and resources, memory resources, and so on. Such dynamic adaptation provides improved (e.g., consistent) user QoE including shorter startup delays, fewer rebuffering events, better video quality, or other improvements.

In accordance with one or more embodiments, enabling DASH on network 100 moves the adaptive streaming intelligence from the server 112 to the client 110, letting the client 110 drive the streaming session and make the decisions on the video adaptation parameters. Thus, an intelligent client adaptation framework built specifically for DASH-based streaming services may be implemented in one or more embodiments to track the session state. Such a paradigm shift from push-based, RTSP-based streaming to pull-based, HTTP-based streaming is capable of delivering an improved or optimal user QoE. Furthermore, due to its differences from traditional RTSP-based streaming services, delivery of DASH-based services over different 3GPP RAN and core IP network architectures may be implemented, with support for QoE-based adaptation and service adaptation. An example diagram of end-to-end QoE delivery of DASH services is shown in FIG. 2.

Figure 2:
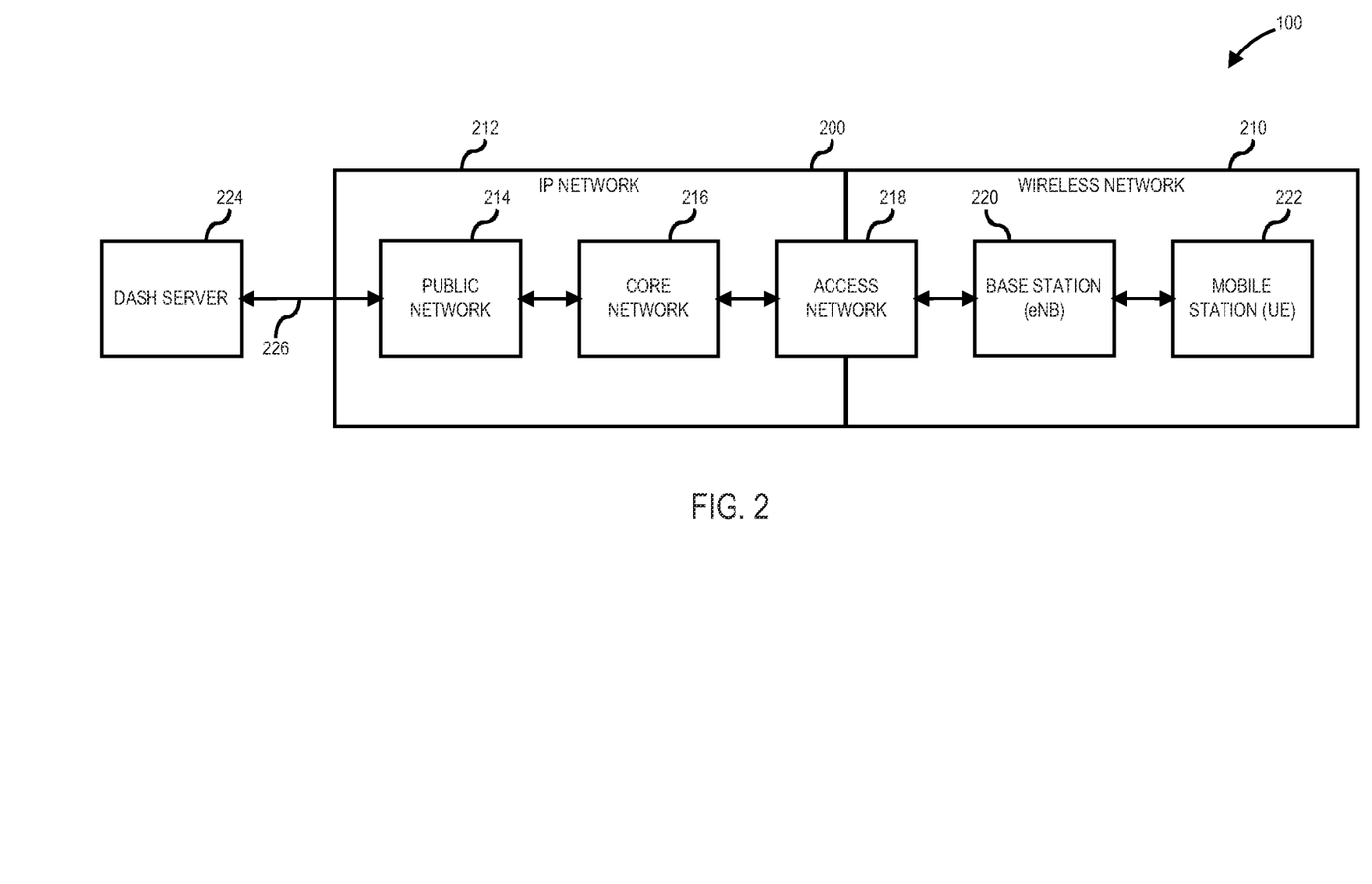
FIG. 2 is a block diagram of an application-aware end-to-end QoE architecture for delivery of DASH services.

FIG. 2 shows an end-to-end QoE architecture 200 that may be utilized to implement the delivery of DASH services on network 100. In the example shown in FIG. 2, network 100 may be a 3GPP network or the like. In one or more alternative embodiments, network 100 may implement an evolution of the 3GPP standard such as a 3GPP LTE standard, an LTE Advanced standard, a Fourth Generation (4G) standard, or other standards. Network 100 may implement an Institute of Electrical Engineers (IEEE) 802.16 standard such as an IEEE 802.16e or IEEE 802.16m standard to implement a WiMAX network or a WiMAX-II network. As shown in FIG. 2, end-to-end QoE architecture 200 comprises a wireless network 210 and an internet protocol (IP) network 212. The subcomponents of the wireless network 210 and the IP network 212 include a public network 214, which may be the Internet, core network 216, access network 218, base station 220 that may be an enhanced NodeB (eNB), and a mobile station 222 that may be user equipment (UE). In accordance with one or more embodiments, a DASH server 224 (web server 112) is capable of providing streaming multimedia content 226 to mobile station 222 (client 110) via the IP network 212 and wireless network 210.

As noted above, in adaptive streaming a client receives a manifest file including metadata that provides quality and rate information for different portions of media available for streaming. For example, the MPD file (in the context of DASH) is obtained by a client, which then requests segments and sub-segments corresponding to the various representations described in the MPD. The client may switch across different representations over random access points (segment access points) by continuously tracking bandwidth, quality, CPU load, or other information in an effort to optimize user QoE. To avoid large quality variations while maintaining a high QoE when switching over random access points, the client may use the quality information provided in the MPD to determine whether, when, and where segment-switching should occur.

In previous adaptive streaming attempts, however, metadata files have contained limited information that the client could use for maintaining a high QoE. For example, media content bandwidth has been specified in the context of the DASH standard according to a bandwidth attribute (@bandwidth) included in a representation element—at the representation level—in an adaptation set of the hierarchical MPD file. Thus, each representation (or sub-representation) may represent an encoded version of media content having different bitrates identified by the @bandwidth attribute.

The @bandwidth attribute has provided DASH clients an ability to switch dynamically between DASH-formatted representations and sub-representations based on a course comparison of the @bandwidth value and an estimate of link bandwidth. But no quality information has previously been made available in the MPD file, which could otherwise be used by the client to readily identify and rule out media components having inadequate or excessive bandwidth needs. Furthermore, the @bandwidth attribute at the representation level had not been signaled to the DASH client in conjunction with the corresponding quality and QoE associated with different encoded media content. Thus, if the DASH client selects DASH-formatted media content segments based on the @bandwidth value in the representation, the following inefficiencies may arise. First, some of the segments (e.g., those for slow-moving scenes) selected for streaming may be encoded with quality that is much higher than what is necessary for display on the DASH client, thereby wasting bandwidth while streaming. Second, other segments (e.g., for fast-moving scenes) may have insufficient quality and detract from the end user experience. Consequently, the previous adaptive streaming technologies do not provide sufficient information to allow a client to switch intelligently between streams based on quality characteristics.

The present inventors recognized that quality-driven adaptations at the client could improve streaming QoE when the quality realized by a selected bitrate (i.e., @bandwidth) falls below a desired or target quantity. Furthermore, bandwidth can be saved when the quality realized by a selected bitrate exceeds a desired quantity. Moreover, content quality may vary significantly across segments and sub-segments of media content, but as noted previously, signaling quality has not been specified in the MPD and has therefore not been available to indicate quality variations between segments or sub-segments in a stream. Quality information provided in the MPD, including minimum and maximum quality information, improves a client's ability to dynamically select and switch between optimal streams based on, for example, each segment's bandwidth and quality.

Figure 3:
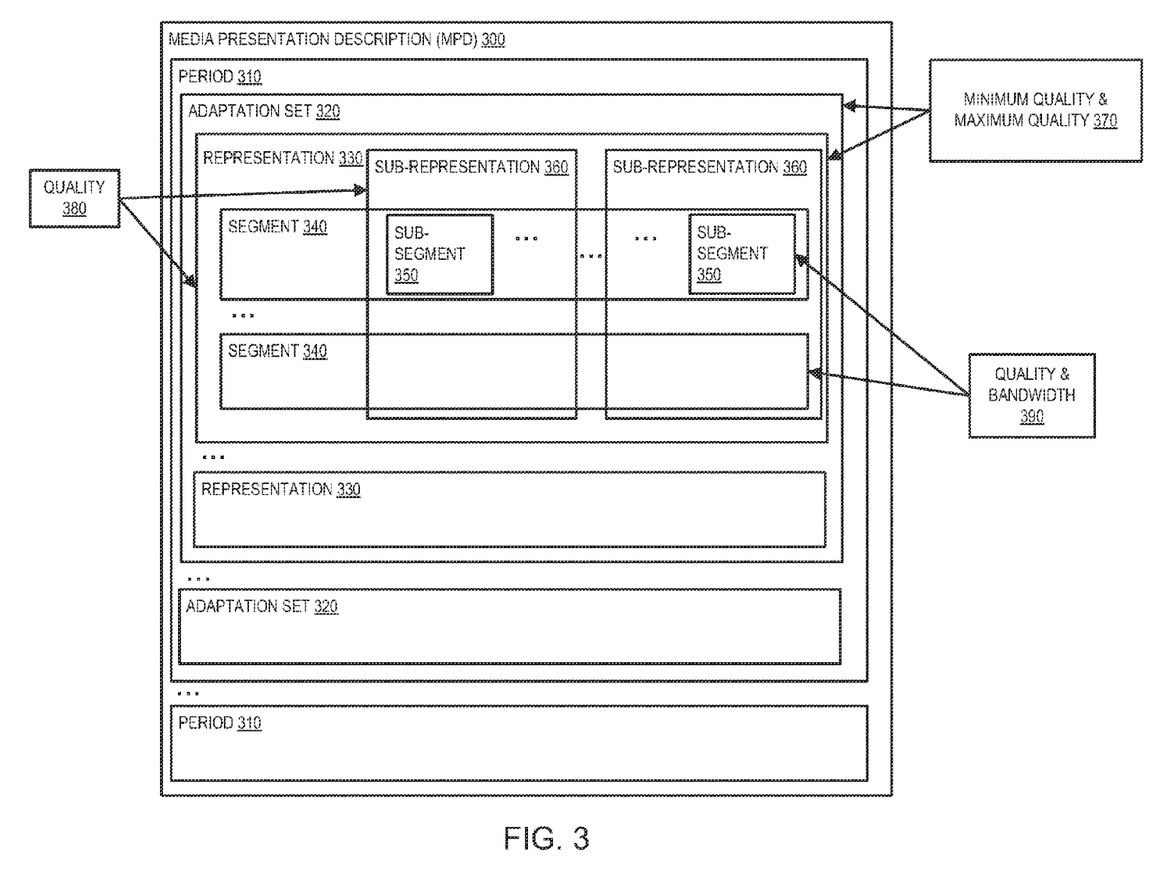
FIG. 3 is a high-level data model block diagram of a hierarchical metadata MPD file structure showing QoE and granular bandwidth attributes included at the adaptation set, representation, sub-representation, segment, and sub-sequent levels.

Accordingly, FIG. 3 shows an MPD data model that includes, at the representation and sub-representation level, quality-related information (in addition to bitrate, resolution, and frame rate information provided previously) for different encoded versions of the various media components. Moreover, it also contains quality and bitrate information across segments and sub-segments of the various representations and sub-representations within a period to indicate quality and rate variations within the media in a more granular fashion, enabling more dynamic and quality-optimal adaptations. Although FIG. 3 shows an MPD file in the context of DASH, the quality data may be included in similar manifest files for other adaptive streaming technologies.

FIG. 3 shows a DASH-formatted MPD file data model 300 (or simply MPD 300) that includes elements containing attributes for quality-aware adaptive streaming. For example, each period 310 contains one or more adaptation sets 320 that itself contains one or more representations 330, which describe media content components (indicated by segments 340) and sub-representations 350. Each representation 330 consists of one or more segments 340 having sub-segments 350. Representations 330 also may contain sub-representations 360, as explained above.

According to some embodiments, adaptation sets 320 include quality information with the following two attributes 370: Minimum quality, which specifies a minimum quality value for all representations in an adaptation set; and maximum quality, which specifies a maximum quality value for all representations in an adaptation set. These attributes contain values that quantify the minimum and maximum quality levels over a specified timeline (e.g., a specified duration of the media content) that may correspond to a period, segment, or sub-segment. In some embodiments, these values may indicate a long-term (or average) minimum and maximum quality measures over the entire duration of the adaptation set. In another embodiment, vectorized sets of quality values may be provided to specify the minimum and maximum quality levels for the adaptation set across different segments and sub-segments.

According to another embodiment, a representation 330 contains an attribute representing quality 380, which assigns a quality value to the content described by the representation 330. This value may quantify the quality level over a specified timeline that may correspond to durations of a period, segment, or sub-segment. In some embodiments, this value may indicate a long-term (or average) quality measure over the entire duration of the representation. In another embodiment, vectorized sets of quality values may be provided to specify quality levels across different segments and sub-segments of the representation. In other embodiments, the two attributes 370, minimum quality and maximum quality, may also be declared at the level of the representation 330, quantifying the quality levels over a specified timeline that may correspond to a period, segment, or sub-segment. In some embodiments, these values may indicate a long-term (or average) minimum and maximum quality measures over the entire duration of the representation. In another embodiment, vectorized sets of quality values may be provided specifying the minimum and maximum quality levels across different segments and sub-segments of the representation.

According to another embodiment, a sub-representation contains the attribute 380 representing a quality metric that assigns a quality value to the content described by the sub-representation. This value may quantify the quality level over a specified timeline that may correspond to a period, segment, or sub-segment. In some embodiments, this value may indicate a long-term (or average) quality measure over the entire duration of the sub-representation. In another embodiment, vectorized sets of quality values may be provided specifying quality levels across different segments and sub-segments of the sub-representation.

Segments and sub-segments may themselves contain an attribute 390 describing bandwidth and quality in a more granular fashion at the level of the segment, the sub-segment, or both. In some embodiments, the bandwidth and quality levels may be specified for a given range of bytes (byte range) within a segment or sub-segment. In general, quality and bandwidth attributes may be associated with any byte range in a segment or sub-segment, or any byte range that spans across multiple segments or sub-segments.

Quality attributes 370, 380, and 390 include quality values that are specified terms of quality metrics that assess or compare the objective or subjective quality of media content. Quality metrics in this context may be any useful metric. Some examples include the following metrics: Video MS-SSIM (Multi-Scale Structural SIMilarity), video MOS (mean opinion score), video quality metrics (VQM), structural similarity metrics (SSIM), peak signal-to-noise ratio (PSNR), perceptual evaluation of video quality metrics (PEVQ), and other objective or subjective quality metrics.

The newly introduced MPD attributes may also be used as part of the QoE metric reporting procedures. QoE evaluation methodologies, performance metrics, and reporting protocols and/or mechanisms may be used to optimize the delivery of HTTP streaming and DASH services. For example, QoE monitoring and feedback can be beneficial for detecting and debugging failures, managing streaming performance, enabling intelligent client adaptation (which can be useful for device manufacturers) and for facilitating QoE-aware network adaptation and service provisioning, which can be useful for the network operator and content/service provider.

Figure 4:
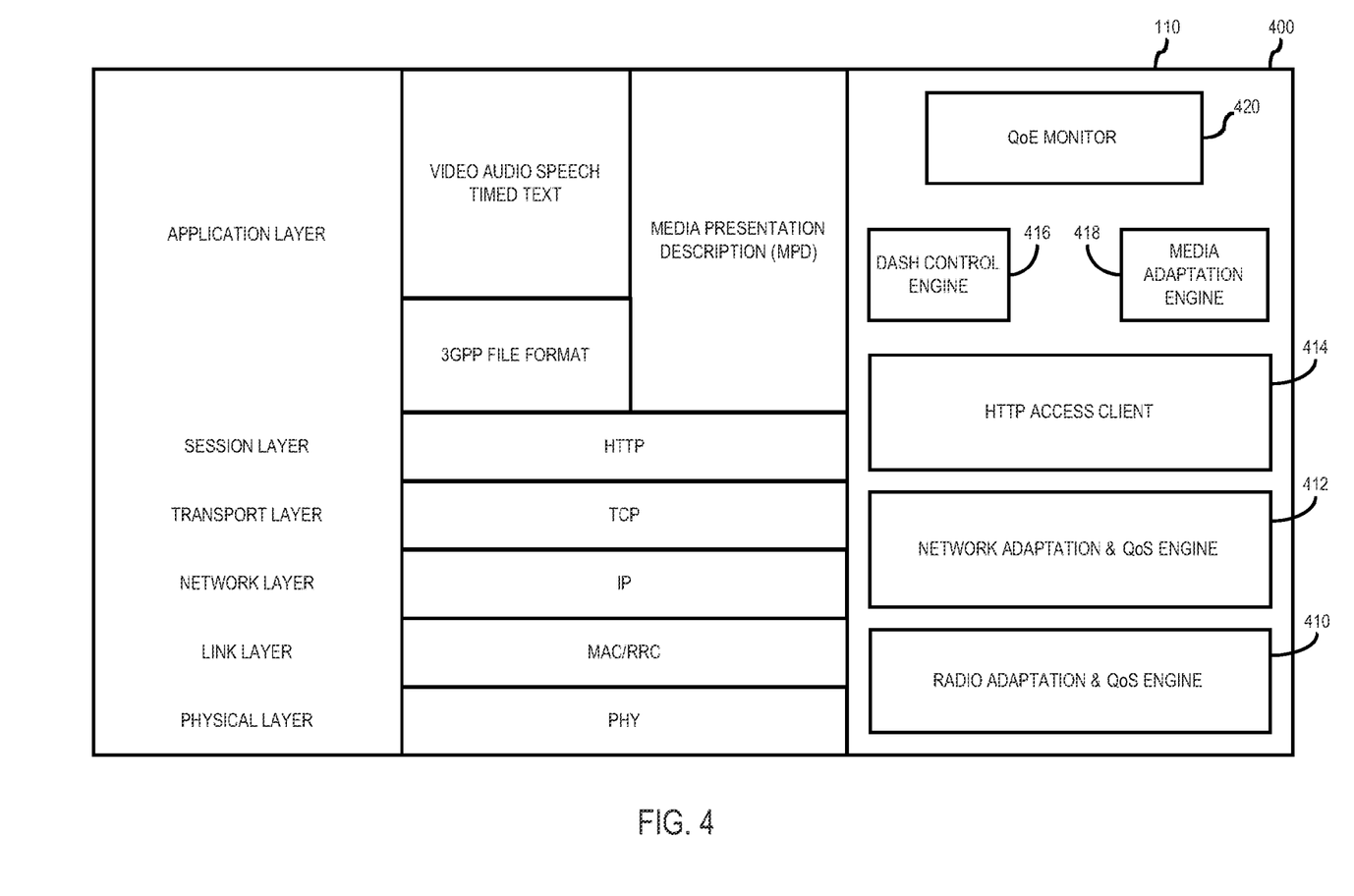
FIG. 4 is a block diagram of a DASH client adaptation architecture.
Figure 5:
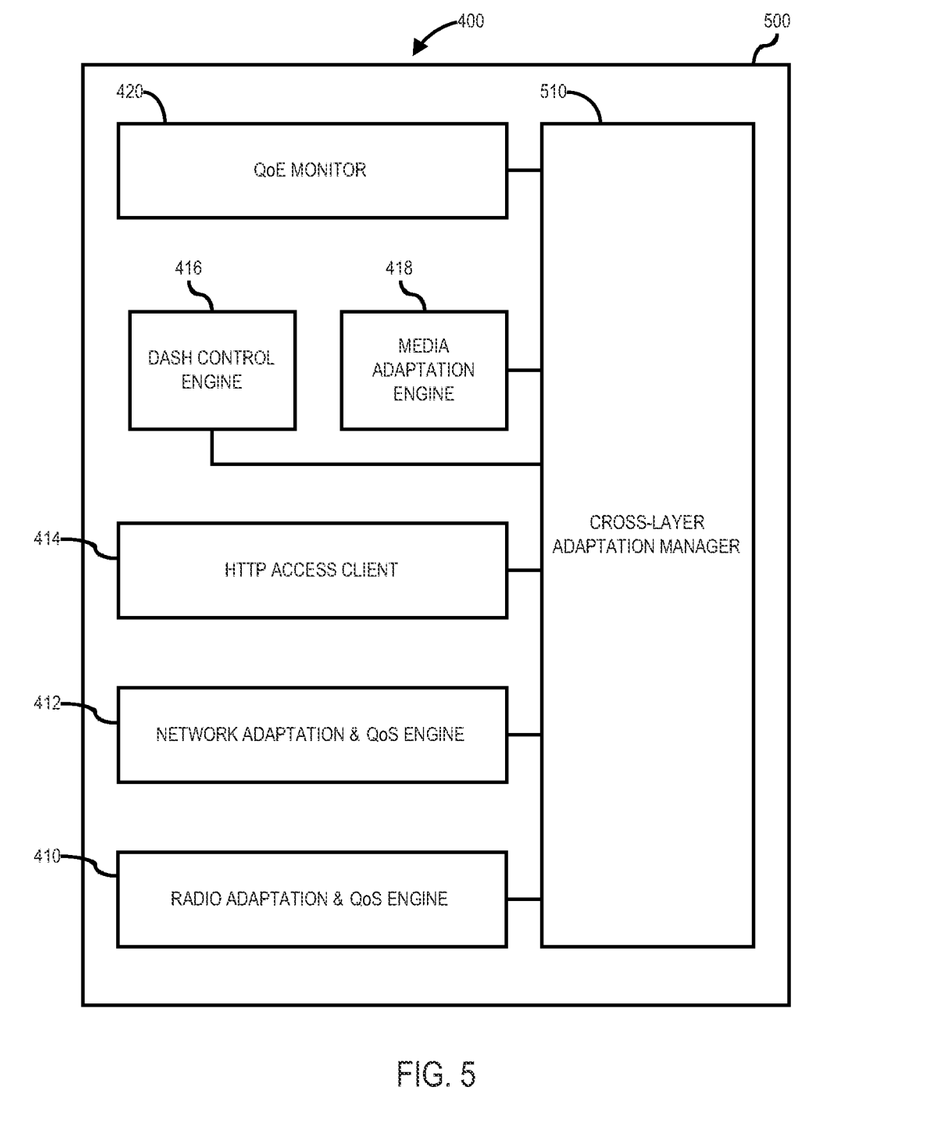
FIG. 5 is a block diagram of a cross-layer optimized DASH client adaptation architecture.

FIG. 4 shows a DASH client adaptation architecture 400 and the associated open systems interconnection (OSI) communication layer information 422 for client 110. The client adaptation architecture 400 of FIG. 4 may comprise a cross-layer optimized platform adaptation architecture for DASH as shown in FIG. 5, below, in which video, transport, and radio components in the platform cooperate and exchange information towards identifying in a joint manner the best platform configurations needed to optimize user QoE. In one or more embodiments, the DASH client adaptation architecture 400 comprises the following system blocks. A radio adaptation and QoS engine block 410 is capable of determining radio-level adaptation and QoS parameters. A network adaptation and QoS engine block 412 is capable of determining network-level adaptation and QoS parameters. An HTTP access client block 414 is capable of handling transport-level hypertext transport protocol/transmission control protocol/internet protocol (HTTP/TCP/IP) operation, and establishing and managing the TCP connections. A DASH control engine block 416 is capable of parsing the MPD, and determining streaming parameters for DASH, for example QoE parameters or bandwidth of a DASH segment duration shown in FIG. 3, or the sequence and timing of HTTP requests. A media adaptation engine 418 is capable of determining codec-level adaptation parameters. An optional QoE monitor 420 is capable of dynamically measuring QoE and comparing to the quality information received in the MPD file.

In one or more embodiments, the DASH client platform 400 may have one or several configurations that may be jointly optimized at the video, transport and/or radio levels via cross-layer cooperation wherein the configurations include the following parameters. Video level parameters may be utilized to configure video bitrate, frame rate, and/or resolution, wherein the decisions of the client 110 are capable of driving the requested content representations from the DASH server 112 based on quality parameters in the MPD file shown in FIG. 3. Transport level parameters may be utilized to configure the sequence and timing of HTTP requests, the number of parallel TCP connections, and/or DASH segment durations. Radio and network level parameters may be utilized to configure modulation and coding scheme (MCS), and/or target QoS parameters for the core network 216 and radio access network 218. The cross-layer optimized DASH client adaptation architecture 500 is shown in and described with respect to FIG. 5, below.

Referring now to FIG. 5, a block diagram of a cross-layer optimized DASH client adaptation architecture in accordance with one or more embodiments will be discussed. The cross-layer optimized DASH client adaptation architecture 500 of FIG. 5 is capable of optimizing configuration of the DASH client adaptation architecture of FIG. 4, above. In one or more embodiments, the cross-layer optimized DASH client adaptation architecture 500 includes a cross-layer adaptation manager 510 that may optimize configuration of the DASH client adaptation architecture 400 by dynamically tracking the following parameters and using them as inputs for the decisions towards jointly adapting the DASH client configurations via cross-layer cooperation. Measured QoE parameters may be utilized to optimize and confirm the VQM, MS-SSIM, SSIM PEVQ, MOS, or other objective or subjective quality metrics. Furthermore, additional parameters may be optimized including: measured video rate-distortion characteristics; user preferences at the application layer; multimedia-related information retrieved from the MPD; information received from the network on current QoS availability and network congestion states; measured dynamic QoS parameters such as throughput, latency, reliability, and so on; measured dynamic channel/network conditions at the radio and transport levels; or power or latency budgets; and central processing unit (CPU)/buffer/memory requirements at the platform architecture level. However, these are merely example parameters that may be optimized via cross-layer optimized DASH client adaptation architecture 500.

Figure 6:
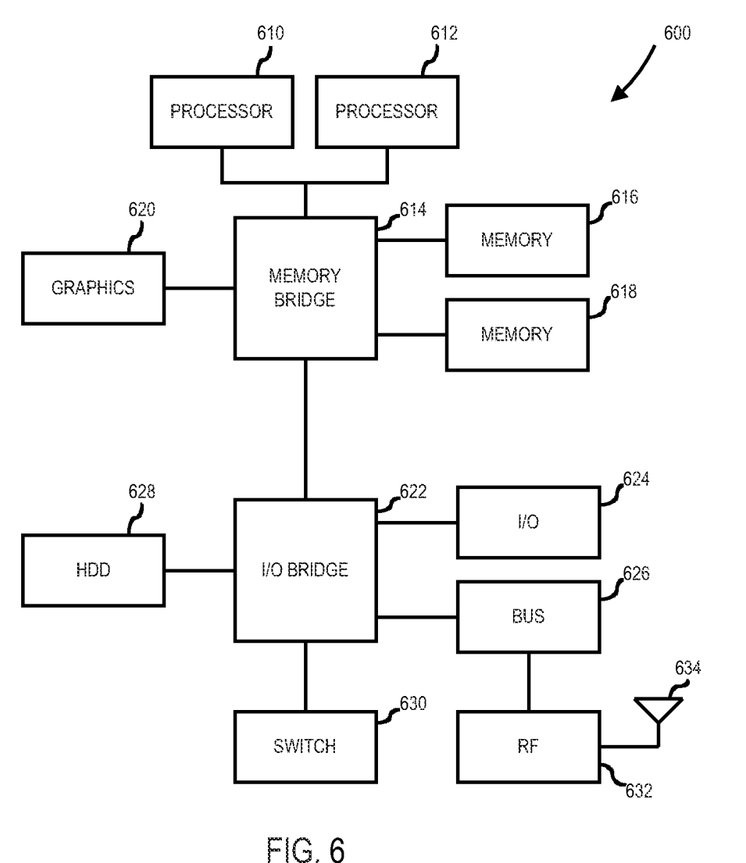
FIG. 6 is a block diagram of an information handling system capable of implementing quality aware adaptive streaming over hypertext transfer protocol.

FIG. 6 shows a block diagram of an information handling system 600 capable of implementing quality-aware adaptive streaming over HTTP in accordance with one or more embodiments. Information handling system 600 may tangibly embody one or more of any of the network elements of network 100 as shown in and described with respect to FIG. 1 and FIG. 2. For example, information handling system 600 may represent the hardware of client 110, an eNB web server 112, and/or web/media server 114, with greater or fewer components depending on the hardware specifications of the particular device or network element. Although the information handling system 600 represents one example of several types of computing platforms, the information handling system 600 may include more or fewer elements and/or different arrangements of elements than shown in FIG. 6.

Information handling system 600 includes one or more processors such as processor 610 and/or processor 612, which may include one or more processing cores. The one or more of processors 610, 612 may couple to one or more memories 616, 618 via memory bridge 614, which may be disposed external to the processors 610, 612, or alternatively at least partially disposed within one or more of the processors 610, 612. The memory 616, 618 may include various types of semiconductor-based memory, for example, volatile type memory and/or non-volatile type memory. The memory bridge 614 may couple to a graphics system 620 to drive a display device (not shown) coupled to the information handling system 600.

The information handling system 600 may further include an input/output (I/O) bridge 622 to couple to various types of I/O systems. An I/O system 624 may include, for example, a universal serial bus (USB) type system, an IEEE 1394 type system, or the like, to couple one or more peripheral devices to the information handling system 600. A bus system 626 may include one or more bus systems such as a peripheral component interconnect (PCI) express type bus or the like, to connect one or more peripheral devices to the information handling system 600. A hard disk drive (HDD) controller system 628 may couple one or more hard disk drives or the like to information handling system, for example, Serial ATA type drives or the like, or, alternatively, a semiconductor-based drive comprising flash memory, phase change, and/or chalcogenide-type memory or the like. A switch 630 may be utilized to couple one or more switched devices to the I/O bridge 622, for example, Gigabit Ethernet type devices or the like. Furthermore, as shown in FIG. 6, information handling system 600 may include a radio-frequency (RF) transceiver 632 comprising RF circuits and devices coupled to one or more antennas 634 for wireless communication with other wireless communication devices and/or via wireless networks such as transmission system 100 of FIG. 1 of FIG. 2. Where the information handling system includes multiple antennas 634, the RF receiver 632 may implement multiple-input, multiple-output (MIMO) communication schemes. An example embodiment of an information handling system in the context of a UE is shown in and described with respect to FIG. 7, below.

Figure 7:
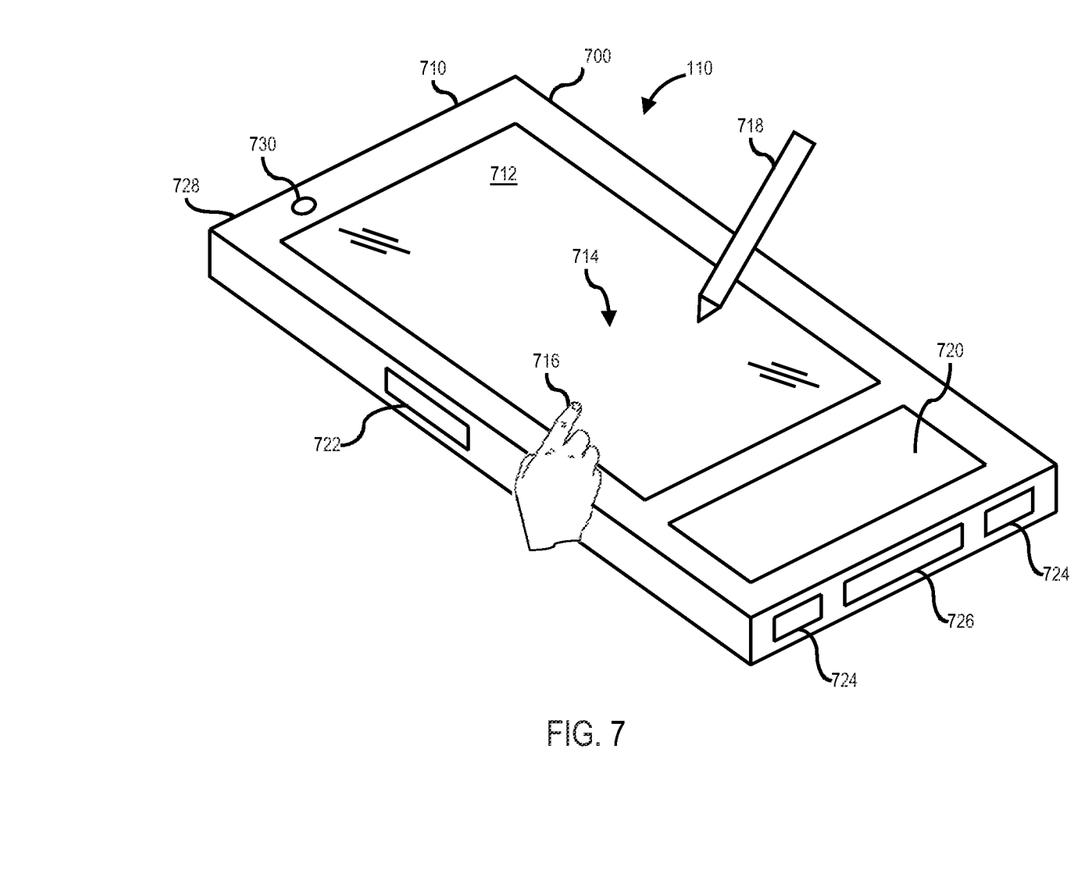
FIG. 7 is an isometric view of an information handling system of FIG., according to a mobile tablet computer embodiment.

FIG. 7 is an isometric view of the information handling system 600 of FIG. 6, embodied as a cellular telephone, smartphone, a tablet-type device, or the like. The system 600 includes the client 110 of FIG. 1, and it implements quality-aware adaptive streaming over HTTP in accordance with one or more embodiments. The information handling system 600 may include a housing 710 having a display 712 which may include a touch screen 714 for receiving tactile input control and commands via a finger 716 of a user and/or via a stylus 718 to control one or more processors 610 or 612. The housing 710 may house one or more components of the information handling system 600, for example, one or more processors 610, 612, one or more of memory 616, 618, or transceiver 632. The information handling system 600 further may optionally include a physical actuator area 720, which may include a keyboard or buttons for controlling information handling systems via one or more buttons or switches. The information handling system 600 may also include a port or slot 722 for receiving non-volatile memory such as flash memory, for example, in the form of a secure digital (SD) card or a subscriber identity module (SIM) card. Optionally, the information handling system 600 may further include one or more speakers and microphones 724, and a connection port for connecting the information handling system 600 to another electronic device, dock, display, battery charger, and so on. In addition, the information handling system 600 may include a headphone or speaker jack 728 and one or more cameras 730 on one or more sides of the housing 710. It should be noted that the information handling system 600 of FIGS. 6 and 7 may include more or fewer elements than shown, in various arrangements.

In some embodiments, the information handling system includes a wireless network device to support quality-aware adaptive media streaming over a network, the wireless network device including a radio-frequency transceiver to receive a manifest file. As discussed with reference to FIG. 3, above, the manifest file is a hierarchical structure defining an adaptation set level including a plurality of representation levels corresponding to different versions of media content. Each representation level includes a plurality of segment levels, and each segment level including a plurality of sub-segment levels. The information handling system 600 has circuitry (e.g., processors 610 or 612) configured to parse a manifest file to read information characterizing encoded portions of media content available for HTTP adaptive streaming (e.g., DASH), and in which the manifest file is an MPD file. The information handling system 600 obtains from a portion of the MPD file a quality attribute parsed from the manifest file. The quality attribute includes quality information that specifies video quality values associated with the encoded portions of the media content. The information handling system 600 also obtains from a bandwidth attribute parsed from the manifest file, bandwidth information that specifies bitrate values associated with the encoded portions of the media content. The information handling system 600 selects, based on the bandwidth information and the quality information, a first encoded portion of the media content for streaming to the wireless network device via the radio-frequency transceiver. The information handling system 600 dynamically switches to a second encoded portion of the media content in response to quality information associated with the first encoded portion of the media content exceeding or falling below a desired video quality value, in which bandwidth information associated with the second encoded portion of the media content indicates that a bitrate value of the second encoded portion does not exceed bandwidth capacity of the network.

It will be understood by skilled persons that many changes may be made to the details of the above-described embodiments without departing from the underlying principles of the invention. Therefore, the scope of the present invention should be determined only by the following claims.

The invention claimed is:

1. A network device to support quality-aware adaptive media streaming over a network, the network device comprising:
 a transceiver to receive a manifest file that defines hierarchical levels including an adaptation set level encompassing one or more other levels including a representation level and a segment level, the hierarchical levels including information characterizing encoded portions of media content available for adaptive streaming; and
 circuitry configured to:
  obtain from a minimum and maximum quality attribute parsed from the adaptation set level of the manifest file, first quality information that specifies respective minimum and maximum video quality values of the encoded portions of the media content;
  obtain from a quality attribute parsed from the one or more other levels of the manifest file, second quality information that specifies quality values associated with the encoded portions of the media content;
  obtain from a bandwidth attribute parsed from the segment level of the manifest file, bandwidth information that specifies segment or sub-segment bitrate values associated with the encoded portions of the media content; and
  dynamically switch streaming between different encoded portions of the media content based on the bandwidth information and on the first and second quality information of a selected stream to maintain a desired video quality value.

2. The network device of claim 1, in which the quality attribute comprises objective video quality information.

3. The network device of claim 1, in which the quality attribute comprises subjective video quality information.

4. The network device of claim 1, in which the quality attribute comprises a quality metric selected from the group consisting of video multi-scale structural similarity (MS-SSIM), video mean opinion score (VMOS), video quality metrics (VQM), structural similarity metrics (SSIM), peak signal-to-noise ratio (PSNR), and perceptual evaluation of video quality metrics (PEVQ).

5. The network device of claim 1, in which the manifest file is a media presentation description (MPD) file.

6. The network device of claim 1, in which the quality attribute is included as information of a dynamic adaptive streaming over hypertext transfer protocol (DASH) representation, a DASH segment, and a DASH sub-segment.

7. The network device of claim 1 comprising a wireless network device in which the transceiver includes a radio-frequency transceiver.

* * * * *